J. Mooney.
Bridge Pier.

Nº 28,765.                    Patented Jun. 19, 1860.

Witnesses;
R. S. Spurier
J. W. Coombs

Inventor;
Jacob Mooney
per Munn & Co.
Attorneys.

UNITED STATES PATENT OFFICE.

JACOB MOOMEY, OF CLINTON, IOWA.

FENDER FOR DOCKS, WHARVES, &c.

Specification of Letters Patent No. 28,765, dated June 19, 1860.

*To all whom it may concern:*

Be it known that I, JACOB MOOMEY, of Clinton, in the county of Clinton and State of Iowa, have invented a new and Improved Fender for Docks, Piers, Canal-Locks, &c.; and I do hereby declare that the following is a full, clear, and exact description of the same, reference being had to the annexed drawings, making a part of this specification, in which—

Figure 1:
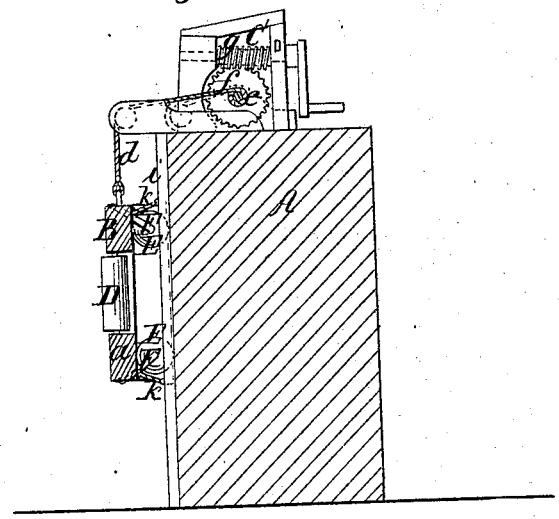
Figure 2:
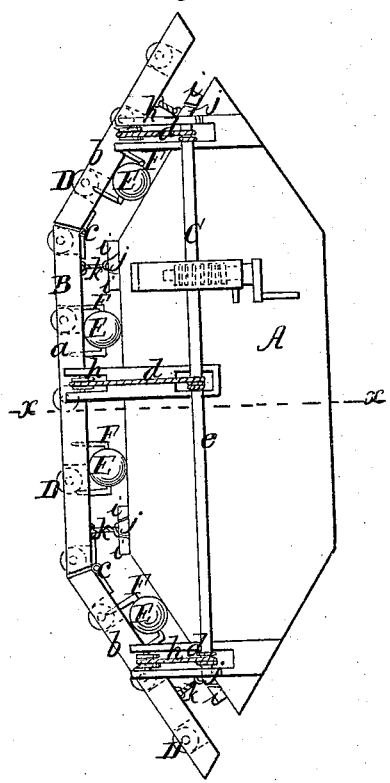

Figure 1 is a vertical section of my invention, taken in the line *x*, *x*, Fig. 2. Fig. 2 is a plan or top view of the same.

Similar letters of reference indicate corresponding parts in the two figures.

The object of this invention is to obtain a simple and efficient device for preventing vessels of navigation being injured by coming in contact with docks, piers, and the like, and one which may be readily applied, and readily adjusted when applied, to suit vessels of various heights as well as to suit the depth of the water so that a proper protection may always be interposed between the vessel and the dock or pier or other structure to which the invention is applied.

The invention consists in the employment or use of a frame provided with rollers and suspended to the dock, pier, or other structure, by means of chains and a windlass, the frame having elastic rollers attached to its inner side and also connected to the dock, pier, or other structure, substantially as hereinafter described to effect the desired end.

To enable those skilled in the art to fully understand and construct my invention I will proceed to describe it.

A represents a portion of a dock, pier, canal lock or other structure to which my invention may be applied, and B is a frame which is composed of three parts *a*, *b*, *b*, connected together by hinges *c*. The frame B, is thus formed in order that it may conform to the side of the dock A, which, it will be seen, has its ends oblique with its central part. Were the side of the dock perfectly straight a single frame only would be required.

The frame B, is suspended by chains *d*, to a windlass C, which is formed of a shaft *e*, having a worm-wheel *f*, upon it, into which a screw *g*, gears. The shaft *e*, extends the whole length of the dock at its top or upper end, or it should be nearly equal in length to the frame B, any number of chains *d*, being used according to the length of the frame B. The chains *d*, pass over guide rollers *h*, on the dock.

The frame B, may be constructed of timber in any proper way and it has vertical rollers D, fitted in it at suitable distances apart, said rollers being of wood or other suitable material, allowed to turn freely in the frame and projecting a short distance beyond its outer or face side, as shown clearly in both figures.

To the inner side of the frame B, there are rollers E, attached. These rollers are of spherical form, and of india-rubber. They are attached to the frame B, by springs F, which may be formed of steel rods bent in staple-form, as shown clearly in Fig. 2, the springs passing centrally through the rubber rollers, and having their ends driven into the inner side of the frame B, rather obliquely, as shown clearly in Fig. 1.

The dock A, at its outer side has vertical guides *i*, attached, between which slides *j*, are fitted, the slides being allowed to work freely up and down between the guides *i*. The frame B, is connected to the slides *j*, by chains *k*, as shown clearly in Fig. 2.

From the above description it will be seen that the frame B, may be readily raised, and lowered by turning the windlass C, and it will also be seen that the frame will, if properly adjusted, prevent a vessel from coming in contact with the dock A. The rollers D, prevent any abrasion of the vessel, and the india-rubber rollers E, when the frame B, receives a blow caused by a vessel coming in contact with it, yield or give and the springs F, which attach said rollers to the frame, also yield and consequently the vessel is prevented from being injured by concussions or collisions with the fender or frame B. The attachment of the frame B, to the slides *j*, causes the former to be retained in proper position near the dock.

In some cases the attachment of the frame or fender to the dock, as shown, to wit: by means of the chains *k*, and slides *j*, may not be required. In some cases they may be important, especially where the frame or fender requires to be made of several parts connected by joints.

The india-rubber rollers E perform the office of friction rollers as the frame or fender is raised and lowered, and they also serve as springs thereby performing a double function. The connection of the rollers to the frame by means of elastic staples or springs F, is an important feature, as they give the frame a greater yielding capacity by allowing the rollers E, to be compressed under the blow which may be given the fender or frame B. It being understood that the rollers E, could not be fully compressed if fitted on rigid axes, in the latter case one half of the diameter of the rollers would only be subjected to pressure.

I am aware that fenders have been used and applied to docks in order to serve as guards to vessels to prevent injury by collisions, and I therefore do not claim broadly such device; but I do claim as new and desire to secure by Letters Patent:—

1. The employment or use of a frame or fender B, provided with rollers D, and suspended from a windlass or other fixture at the top of a dock, pier or other structure, when said frame or fender is provided with india-rubber rollers E, at its inner side to operate substantially as and for the purpose set forth.

2. The peculiar manner of attaching the india rubber rollers E, to the inner side of the frame or fender B, to wit: by means of the springs or elastic staples F, to operate as and for the purpose set forth.

3. The connection of the frame or fender B, to the dock A, by means of the chains $k$, and slides $j$, substantially as described.

JACOB MOOMEY.

Witnesses:
F. P. WILCOX,
JOHN JENKINS.